US006949305B2

United States Patent
Terazawa et al.

(10) Patent No.: US 6,949,305 B2
(45) Date of Patent: Sep. 27, 2005

(54) SEPARATOR FOR FUEL CELL, METHOD FOR PRODUCING SEPARATOR AND FUEL CELL APPLIED WITH SEPARATOR

(75) Inventors: Toshihisa Terazawa, Anjo (JP); Shinji Nezu, Obu (JP); Masami Ishii, Toyota (JP)

(73) Assignee: Aisin Seiki Kabushiki Kaisha, Kariya (JP)

( * ) Notice: Subject to any disclaimer, the term of this patent is extended or adjusted under 35 U.S.C. 154(b) by 398 days.

(21) Appl. No.: 10/025,480

(22) Filed: Dec. 26, 2001

(65) Prior Publication Data

US 2002/0127464 A1 Sep. 12, 2002

(30) Foreign Application Priority Data

Dec. 26, 2000 (JP) .......................................... 2000-396060

(51) Int. Cl.[7] ................................................. H01M 2/00
(52) U.S. Cl. ........................... 429/34; 429/38; 429/247; 429/249; 429/254; 264/241
(58) Field of Search ........................... 429/34, 38, 247, 429/249, 254; 264/241

(56) References Cited

U.S. PATENT DOCUMENTS 6,242,124 B1 * 6/2001 Saito et al. .................... 429/38
2002/0028368 A1 * 3/2002 Saito et al. .................... 429/34

FOREIGN PATENT DOCUMENTS

| JP | 5-217711 | * 8/1993 |
| JP | 2000-243409 | 9/2000 |
| JP | 2000-331690 | * 11/2000 |

* cited by examiner

*Primary Examiner*—Laura Weiner
(74) *Attorney, Agent, or Firm*—Oblon, Spivak, McClelland, Maier & Neustadt, P.C.

(57) ABSTRACT

A method for producing a separator for a fuel cell including, first, mixing carbon particles with thermoplastic resin particles to produce mixed particles, and kneading the mixed particles into pellets. Second, the pellets are extruded and formed into a sheet-form base material. Third, the sheet-form base material is grooved by rolling with a roller having a pattern on a peripheral surface thereof. The pattern on the roller is transferred on the separator to have a predetermined groove pattern.

7 Claims, 6 Drawing Sheets

SEPARATOR FOR FUEL CELL, METHOD FOR PRODUCING SEPARATOR AND FUEL CELL APPLIED WITH SEPARATOR

This application is based on and claims priority under 35 U.S.C. § 119 with respect to Japanese Patent Application No. 2000-396060 filed on Dec. 26, 2000, the entire content of which is incorporated herein by reference.

FIELD OF THE INVENTION

This invention relates to a separator of a fuel cell, a method for producing thereof and the fuel cell. The invention specially relates to the separator of a solid polymer electrolyte fuel cell for a vehicle, a method for producing thereof, and the solid polymer electrolyte fuel cell.

BACKGROUND OF THE INVENTION

As is well known, conventional solid polymer electrolyte fuel cells are formed by stacking unit cells. The unit cell is formed by a solid polymer electrolyte membrane formed by an ion exchange membrane, electrodes disposed on both sides of the solid polymer electrolyte membrane, and a separator with grooves (groove pattern) for supplying a fuel gas and an oxidizer gas to each of the electrodes.

The unit cell generates an electric power by electrochemical reaction between the fuel gas supplied to an anode electrode side and the oxidizer gas supplied to a cathode electrode side, and then the unit cell provides the electric power to an exterior device. Thus the separator needs to have a performance for separating the fuel gas from the oxidizer gas and sufficient strength not to be damaged in order not to leak both gases.

To improve the strength of the separator, a method for producing the separator has been improved in the development for fuel cells. For example, the separator is made of a metal plate or a carbon plate formed by a cutting machine.

Since it is very expensive to produce the separators by machining the metal plate or the carbon plate, the separator has been produced by a compression molding or an injection molding with a resin and carbon particles instead of machining. The separator produced by compression molding or injection molding is lower in cost and is higher in strength compared to the separator produced by machining.

For example, according to a Japanese Patent Application Publication published on Sep. 8, 2000, as Toku-Kai 2000-243409, the compression molding is employed as the method for producing the separator. The cost of compression molding is lower than the machining, but the process of compression molding takes a longer time due to warm and cool die assembly and curing time for the resin (at least 5 minutes), the productivity of the separator is therefore not efficient. The method by the compression molding has problems in the dimensional accuracy and flatness of the separator resulting from burrs (or flash) by molding and various thicknesses.

According to another Japanese Patent Application Publication published on Nov. 30, 2000, as Toku-Kai 2000-331690, the injection molding is employed as the method for producing the separator. The injection molding dose not take a longer process time for cooling the die assembly and curing time for the resin, the productivity of the injection molding is more improved than that of the compression molding method. But, in the injection molding, material to be molded needs to have high fluidity in the die assembly. Thus the material for the injection molding needs to contain much resin as a binder for binding carbon particles. As the separator, containing the much resin is not preferable because the conductivity of the entire separator is decreased. The prerequisite area of the separator is decided by the electric current in the stacks of the fuel cell. According to the fuel cell for the vehicle, the stacks need to be minimized in the thickness direction. To keep the fluidity of the material, minimizing the stacks in the thickness direction is difficult.

SUMMARY OF THE INVENTION

A method for producing a separator for a fuel cell includes the following three steps. First, carbon particles are mixed with thermoplastic resin particles to produce mixed particles, and the mixed particles are kneaded to be pellets. Second, the pellets are extruded to be formed into a sheet-form base material. Third, the sheet-form base material is grooved by rolling with a roller having a pattern on a peripheral surface thereof. The pattern on the roller is transferred to the separator to have a predetermined groove pattern.

Furthermore, the thermoplastic resin particles are preferable to be contained between 20 and 40 weight percent relative of the whole mixed particles.

BRIEF DESCRIPTION OF THE DRAWINGS

The foregoing and additional features and characteristics of the present invention will become more apparent from the following detailed description considered with reference to accompanying drawings in which like reference numerals designate like elements.

DETAILED DESCRIPTION OF THE INVENTION

Hereinafter, an embodiment of the present invention will be described in reference with attached drawings. A method for producing a separator of a fuel cell as the embodiment of the present invention is described based on FIG. 1.

First, a manufacturing system used for the method for producing the separator of the fuel cell of the present invention is described hereinafter with reference to FIG. 1.

Figure 1:
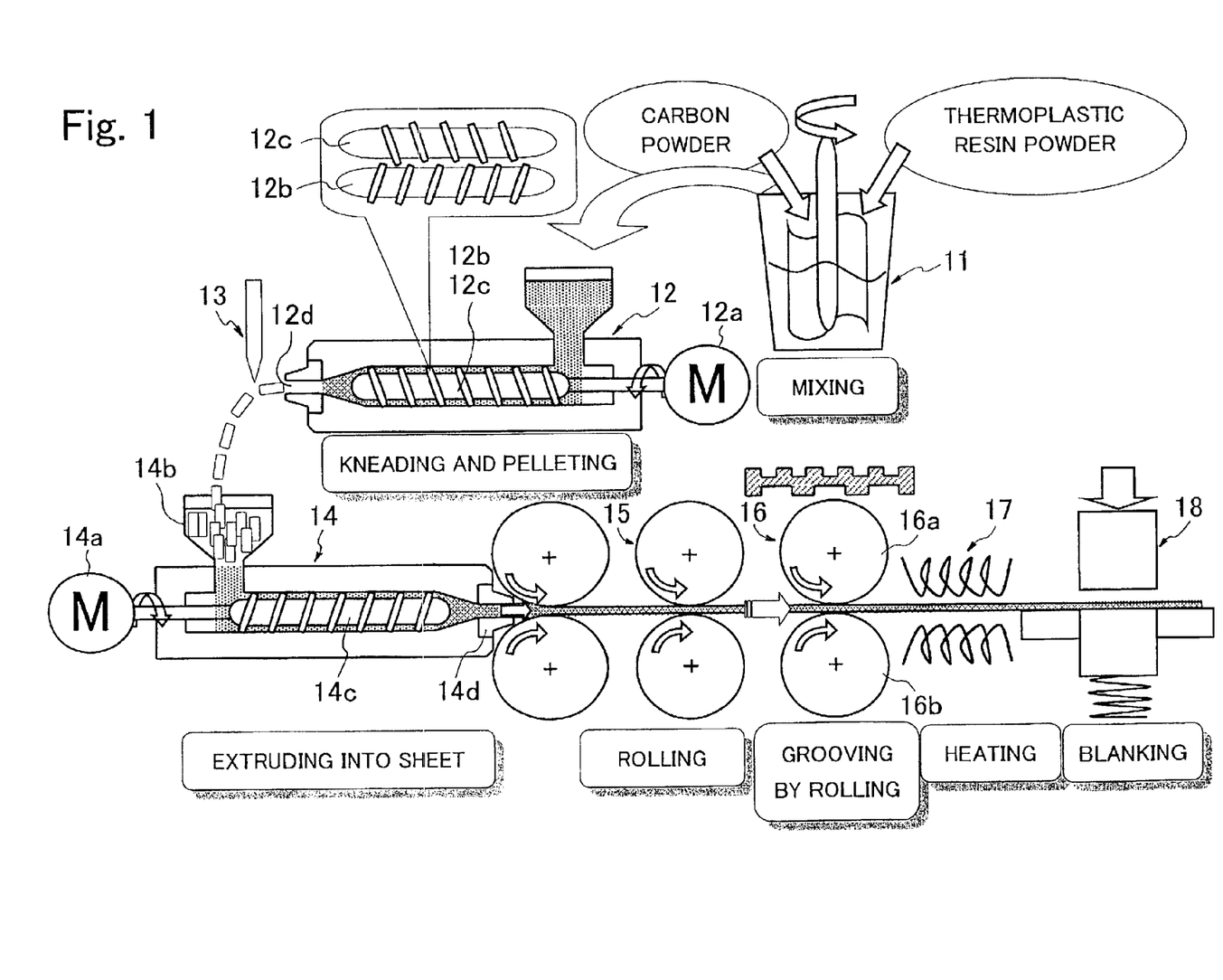
FIG. 1 shows a schematic block diagram of a method for producing a separator of a polymer electrolyte membrane type fuel cell of the present invention.

The manufacturing system includes a mixer 11, a two-axial, screw-type kneader 12 (two-axial kneader mixer), and a cutter 13 as shown in FIG. 1. The mixer 11 is provided for stirring a carbon powder and a thermoplastic resin powder to be mixed therewith. The mixed powder stirred up by the mixer 11 is sent to the two-axial, screw-type kneader 12. The two-axial, screw-type kneader 12 has two screws 12b and 12c therein. Since the screws 12b and 12c are driven by a motor 12a provided at one end of the two-axial, screw-type kneader 12, the screws 12b and 12c are rotated to knead and push the mixed powder toward an opening 12d formed at the other end of the two-axial, screw-type kneader 12. Mixture kneaded in the two-axial, screw-type kneader 12 is projected from the opening 12d and cut by a cutter 13 to form uniform pellets or grains as shown in FIG. 1.

The manufacturing system shown in FIG. 1 further includes an extruding machine 14, first rolling rollers 15, second rolling rollers 16, a heater 17 and a blanking die assembly 18. The extruding machine 14 has a container 14b at one end thereof. The container 14b is disposed for receiving the pellets (or the grains) from the two-axial, screw-type kneader 12. The extruding machine 14 further has a screw 14c therein. The screw 14c is driven by the motor 14a provided at one end of the extruding machine 14, and operated to crush and compress the pellets from the container 14b. The pellets are therefore formed to be a base material inside the extruding machine 14. The extruding machine 14 is further disposed with a T-shaped die 14d. The T-shaped die 14d is disposed at the other end of the extruding machine 14. The T-shaped die 14d has an opening having a predetermined shape for forming the base material into a sheet. The base material pushed by the screw 14c is extruded through the opening of the T-shaped die 14d. The extruding machine 14 further has a heating device (not shown) for applying a heat to the base material within the extruding machine 14 at a predetermined temperature.

The first rolling rollers 15 are formed by upper and lower rollers having plane peripheral surfaces for rolling the sheet-form base material. While, the second rolling rollers 16 are constructed by an upper roller 16a and a lower roller 16b for rolling and grooving. The upper roller 16a and the lower roller 16b have inverted groove patterns on the peripheral surfaces thereof. The inverted groove patterns correspond to predetermined groove patterns to be formed on both upper and lower sides of the sheet-form base material. In addition, each of the first rolling rollers 15 and the second rolling rollers 16 has a heating device (not shown) for heating the peripheral surfaces of the rollers to keep at each predetermined temperature. The heater 17 is provided next to the second rollers 18 as shown in FIG. 1. The heater 17 applies heat to the grooved sheet-form base material at a predetermined temperature. The blanking die assembly 18 is provided next to the heater 17. The blanking die assembly 18 blanks the heated sheet-form base material into a predetermined shape.

Next, the method for producing the separator of the present invention will be described.

First, carbon powder and thermoplastic resin powder are mixed. The carbon powder is prepared in proportion from 60 to 80 weight percent of the whole mixed powder (the carbon powder and the thermoplastic resin). On the other hand, the thermoplastic resin powder is provided from 20 to 40 weight percent of the whole mixed powder. Both the carbon powder and the thermoplastic resin powder are sent into the mixer 11 to be mixed therewith. As the thermoplastic resin, polyphenyl sulfide PPS, polyvinylidene fluoride PVdF or liquid crystal polyester LCP and so on are prepared. As the thermoplastic resins employed in the fuel cell, one of the aforementioned thermoplastic resins having a mechanical strength guaranteed in temperature range from 80 to 100° C. wherein the fuel cell is actually activated. Furthermore, it is preferable to contain the thermoplastic resin more than 20 and less than 40 weight percent in proportion to the whole mixed powder. If the thermoplastic resin powder is not contained in less than 20 weight percent in the whole mixed powder, the pellets formed in the two-axial, screw-type kneader 12 or the sheet extruded from the extruding machine 14 may be non-uniformly molded at next step.

Second, the resulting mixed powder including the carbon powder and the thermoplastic resin powder is sent from the mixer 11 to the two-axial, screw-type kneader 12 shown in FIG. 1. The mixed powder is kneaded in the two-axial, screw-type kneader 12 to be the mixture. The mixture kneaded in the two-axial, screw-type kneader 12 is projected from the opening 12d and cut by the cutter 13 to form the uniform pellets or grains as shown in FIG. 1. The resulting pellets (or the grains) are sent into the container 14b of the extruding machine 14. Then the pellets are crushed and extruded through the opening of the T-shaped die 14d to be formed as a sheet-form base material.

Third, the sheet-form base material formed by the extruding machine 14 is sent into the first rolling rollers 15 and the second rolling rollers 16. The second rolling rollers 16 are constructed by the upper roller 16a and the lower roller 16b. Each of the upper roller 16a and the lower roller 16b has different inverted groove pattern on the peripheral surfaces thereof, respectively. The inverted groove patterns are determined by inverting predetermined groove patterns which are designed for supplying the fuel gas, the oxidizer gas, and cooling water to the electrodes of the fuel cell. Then the sheet-form base material is grooved to have the predetermined groove patterns on both surfaces by rolling with the first rolling rollers 15 and the second rolling rollers 16.

The sheet-form base material grooved by the rollers is sent into the heater 17 in FIG. 1 to be set at the predetermined temperature. After heating, the sheet-form base material is sent into the blanking die assembly 18 to be cut out or formed into the separator having a desired profile.

The comparison table between the method of the present invention by the rolling machine and the conventional methods is shown as below.

TABLE 1

Comparison between separators manufactured by each molding

| Forming method | Kind of Resin | Process Time | Manufacturing Cost | Dimensional Accuracy | Resin quantity (wt %) | Properties Conductivity | Mechanical Strength |
|---|---|---|---|---|---|---|---|
| Compression Molding | Thermosetting Resin | More than 5 min | Δ | X | More than 10 wt % | ○ | ○ |
|  | Thermoplastic Resin | More than 20 min | X | X | More than 10 wt % | ○ | ○ |

TABLE 1-continued

Comparison between separators manufactured by each molding

| Forming method | Kind of Resin | Process Time | Manufacturing Cost | Dimensional Accuracy | Resin quantity (wt %) | Properties Conductivity | Mechanical Strength |
|---|---|---|---|---|---|---|---|
| Injection Molding | Thermosetting Resin | 30 to 60 sec | ○ | X | More than 40 wt % | X | ○ |
| | Thermoplastic Resin | 30 to 60 sec | ○ | X | More than 30 wt % | Δ | ○ |
| Rolling Molding | Thermoplastic Resin | 30 to 60 sec | ○ | ○ | More than 20 wt % | ○ | ○ |

As shown in Table 1, one conventional method employing a compression molding needs the process time for above 5 minutes, thus the one conventional method is not effective. Other conventional method employing an injection molding shown in Table 1 can not provide the enough dimensional accuracy and flatness of the separator resulting from burrs by molding and various thickness of mold members. Though the other conventional method can reduce the process time by using the thermoplastic resin, the injection molding needs fluidity of material to be molded, the material must contain the thermoplastic resin above 30 weight percent of the whole weight of separator, the conductivity of the separator is therefore decreased.

On the other hand, the method of the present invention employing extruding and rolling can drastically shorten the process time. Since the fluidity of the material is not so important for the rolling, the thermoplastic resin needs to be contained at most 20 weight percent relative to whole weight of the separator. Then the method of the present invention employing the extruding and rolling is preferable in the viewpoint of manufacturing cost and the dimensional accuracy. The evaluation of the mechanical strength in Table 1 are determined from comparison with the mechanical strength of the separator which is cut out from carbon plate by machining. In Table 1, the mechanical strength of all methods is preferable.

Hereinafter, the invention is described in more detail by reference to the following Examples 1 to 4 and Comparative examples 1 to 3 shown in Table 2.

EXAMPLE 1

Step 1

Accurately, 400 g of squamiform graphite powder (carbon powder) and 100 g of the polyphenyl sulfide PPS (thermoplastic resin) were prepared and provided into the mixer 11. The graphite powder and the polyphenyl sulfide PPS were mixed in four times, therefore 2 kg of the mixed powder was prepared.

Step 2

The resulting mixed powder was kneaded at 300° C. and in 200 rpm by the two-axial, screw-type kneader 12 to be the mixture. After kneading, the resulting mixture was projected from the two-axial, screw-type kneader 12 and cut by the cutter 13 to be the pellets (or grains). Accordingly, the equal-sized pellets having the length of approximately 5 mm (or grains having the diameter of approximately 0.1 mm to 2 mm) was formed.

Step 3

The resulting pellets (or grains) were sent into the extruding machine 14 in FIG. 1. In the extruding machine 14, the pellets (or grains) from the two-axial, screw-type kneader 12 were formed into the sheet-form base material by being extruded through the T-shaped die 14d. Then the sheet-form base material was rolled by the first rolling rollers 15 at 230° C. Next the rolled sheet-form base material was further rolled by the second rolling rollers 16 at 180° C. Accordingly, the separator having the width of 100 mm and the thickness of 3 mm was manufactured after the above rolling processes. The separator was preferable in appearance. In this step, a width of the opening of the injection machine with the T-shaped die 14d was determined to be 100 mm. A height of the opening was determined to be 4 mm. The clearance between the first rollers 15 was determined to be 3.8 mm. The clearance between the second rollers 16 was determined to be 3.0 mm.

EXAMPLE 2

At Step 1, accurately, 300 g of the squamiform graphite powder as the carbon powder and 200 g of the polyphenyl sulfide PPS as the thermoplastic resin checkweighed were mixed to be the mixed powder. The mixed powder was processed as same as Step 2 and Step 3 in Example 1. The separator member which was preferable in appearance could be manufactured.

EXAMPLE 3

Step 1

Accurately, 350 g of the squamiform graphite powder (carbon powder) and 150 g of the polyvinylidene fluoride PVdF powder (thermoplastic resin powder) were prepared and provided into the mixer. The graphite powder and the polyvinylidene fluoride PVdF powder were mixed in four times, 2 kg of the mixed powder was therefore manufactured.

Step 2

The resulting mixed powder was kneaded at 230° C. and in 200 rpm by the two-axial, screw-type kneader 12 to be the mixture. After kneading, the resulting mixture was projected from the two-axial, screw-type kneader 12 and cut by the cutter 13 to be the pellets (or grains). Accordingly, the even-sized pellets having the length of approximately 5 mm (or grains having the diameter of approximately 0.1 mm to 2 mm) was manufactured.

Step 3

The resulting pellets (or grains) were sent into the extruding machine 14 in FIG. 1. In the extruding machine 14, the pellets (or grains) from the two-axial, screw-type kneader 12 were formed into the sheet-form base material by being extruded through the T-shaped die 14d. Then the sheet-form base material was rolled by the first rolling rollers 15 at 180° C. Next the rolled sheet-form base material was further rolled and grooved by the second rolling rollers 16 at 80° C. Accordingly, the separator having the width of 100 mm and the thickness of 3 mm was manufactured after the above rolling processes. The separator was preferable in appearance. In this step, a width of the opening of the T-shaped die 14d was determined to be 100 mm. A height of the opening was determined to be 4 mm. The clearance between the first rollers 15 was determined to be 3.8 mm. The clearance between the second rollers 16 was determined to be 3.0 mm.

COMPARATIVE EXAMPLE 1

Except that 425 g of the squamiform graphite powder and 75 g of the polyphenyl sulfide PPS powder were prepared and mixed in the mixer 11 at Step 1, the remaining procedures were as same as Steps 1 to 3 of Example 1. But the sheet-form base material could not be extruded through the opening of the T-shaped die 14d of the extruding machine 14 at Step 2.

COMPARATIVE EXAMPLE 2

Except that 250 g of the squamiform graphite powder and 250 g of the polyphenyl sulfide PPS powder were prepared and mixed in the mixer 11 at Step 1, the remaining procedures were as same as Steps 1 to 3 of Example 1. Then the resulting separator was preferable in appearance. But the separator has large resistivity (343 mΩ·cm), the separator can not be employed as a separator of the fuel cell.

COMPARATIVE EXAMPLE 3

Except that 250 g of the squamiform graphite powder and the 250 g of the polyvinylidene fluoride PVdF powder were prepared and mixed in the mixer 11 at Step 1, the remaining procedures were as same as Steps 1 to 3 of Example 3. Then the resulting separator was preferable in appearance. But the separator had high resistivity as same as that of Comparative example 2, the separator was not preferable to use as a separator of the fuel cell.

EVALUATION OF COMPARATIVE EXAMPLES

Test pieces were taken or cut out from the separator by machining. The test pieces were evaluated by measuring density, gas permeability, resistivity and so on. But the separator of Comparative example 1 could not be cut, then the test piece of Comparative example 1 could not be sampled. The test pieces of Comparative examples 2 and 3 had high resistivities. Thus the sheet-form base materials produced as Comparative examples 2 and 3 were not preferable to be used as separators of the fuel cells. The testing methods for evaluation of the examples and the comparative examples were described in detail as follows.

Density

Density was evaluated with a test piece having the length and width of 100 mm and the thickness of approximately 3 mm. Density was found or calculated as weight divided by volume of the test piece.

Gas Permeability

Gas permeability was evaluated by employing a test piece having the diameter of 55 mm and the thickness of 3 mm, a testing chamber compartmented by the test piece, hydrogen gas, and nitrogen gas. The test piece was fixed by a holder disposed inside the testing chamber, then the testing chamber was divided into two sections or spaces by the test piece. Hydrogen gas $H_2$ was filled to one divided section of the testing chamber to pressurize the test piece at 0.1 to 1 kg/cm$^2$, and a predetermined amount of nitrogen gas $N_2$ (carrier gas) was flown through the other divided section of the testing chamber. Gas permeability was found by detecting hydrogen gas density in the nitrogen gas flow with gas chromatograph.

Resistivity

Resistivity in the thickness direction of the test piece was measured by a potential drop when a predetermined electric pressure was applied to opposite sides of the test piece with mercury electrodes having the diameter of 30 mm.

Bending Strength

Bending strength was evaluated by testing a test piece having the width of 10 mm and the length of 80 mm, based on Japanese Industrial Standard JIS K-7203, Testing Method for Flexural Properties of Rigid Plastics wherein a distance defined between supporting points L equals to 60 mm.

The results of Examples 1 to 3 and Comparative examples 1 to 3 are shown in detail in the following Table 2.

TABLE 2

Results of Examples and Comparative Examples

| | Resin | Compounding Ratio (wt %) | Density (g/cm$^3$) | Gas Permeability (cc · cm/cm$^2$ · sec · atm) | Resistivity (mΩ · cm) | Bending Strength (kgf/mm$^3$) |
|---|---|---|---|---|---|---|
| Example 1 | PPS | 20 | 1.92 | Below 10$^{-8}$ | 15 | 4.9 |
| Example 2 | PPS | 40 | 1.75 | Below 10$^{-8}$ | 45 | 6.2 |
| Example 3 | PVdF | 30 | 1.95 | Below 10$^{-8}$ | 19 | 5.2 |
| Comparative example 1 | PPS | 15 | *1 | *2 | *2 | *2 |
| Comparative example 2 | PPS | 50 | 1.64 | Below 10$^{-8}$ | 343 | 6.4 |
| Comparative example 3 | PVdF | 50 | 1.98 | Below 10$^{-8}$ | 162 | 5.8 |

*1) Any sheet-form base materials are not available.
*2) Measurements are not applicable.

EXAMPLE 4

Step 1

Figure 2:
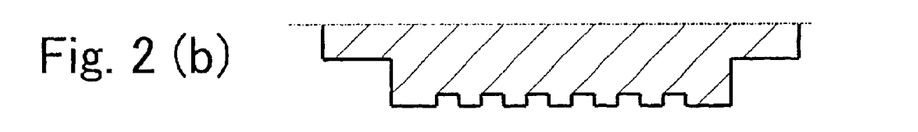
FIG. 2 shows a schematic view of a pair of rollers used in fourth example.
Figure 3:
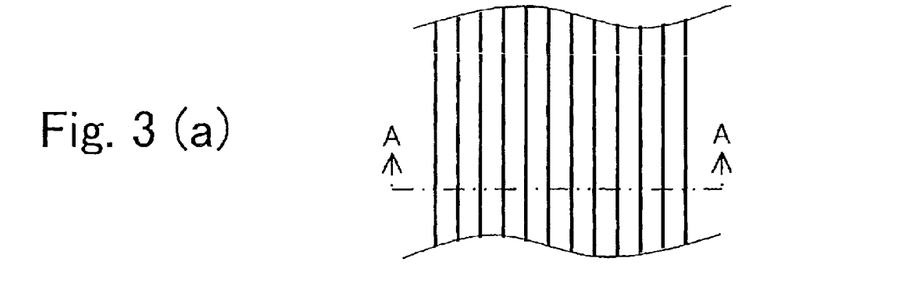
FIG. 3 shows a schematic view of separator formed by the rollers shown in FIG. 2.

The pellets were processed by the same procedures as Steps 1 and 2 of Examples 1 to be the sheet-form base material. Then the base material was rolled by the first rolling rollers 15 heated at 230° C. Next, the rolled base material was further rolled and grooved by the upper roller 16a and the lower roller 16b at 180° C., which were provided in the rolling rollers 16 shown in FIG. 1. Each of the upper roller 16a and the lower roller 16b had the groove pattern on each peripheral surface as shown in FIG. 2(*a*). The sheet-form base material was formed or molded to be the separator shown in FIG. 3, which was preferable in appearance, which had the width of 1.5 mm and the thickness of 1.5 mm, and wherein the groove pattern was formed. FIG. 3(*b*) shows a cross sectional view taken along the line A—A of FIG. 3(*a*). In addition, FIG. 2(*b*) and (*c*) show cross sectional views taken along the line X—X on the upper roller 16a and the line Y—Y on the lower roller 16b, respectively.

EXAMPLE 5

The two separators produced in Example 4 having flat surfaces at each one side were prepared to manufacture a new separator. The flat surfaces of two prepared separators were connected each other by an ultrasonic bonding, the new separator was therefore formed of the two separators. The new separator had groove patterns on its both sides.

EXAMPLE 6

Figure 4:
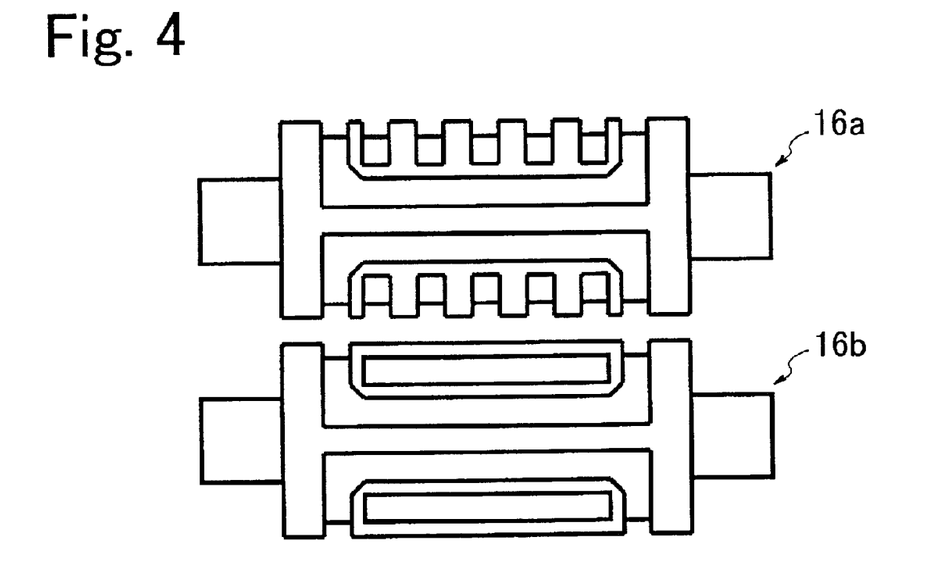
FIG. 4 shows a schematic view of a pair of rollers used in sixth example that the convex portions and concave portions are formed.
Figure 5:
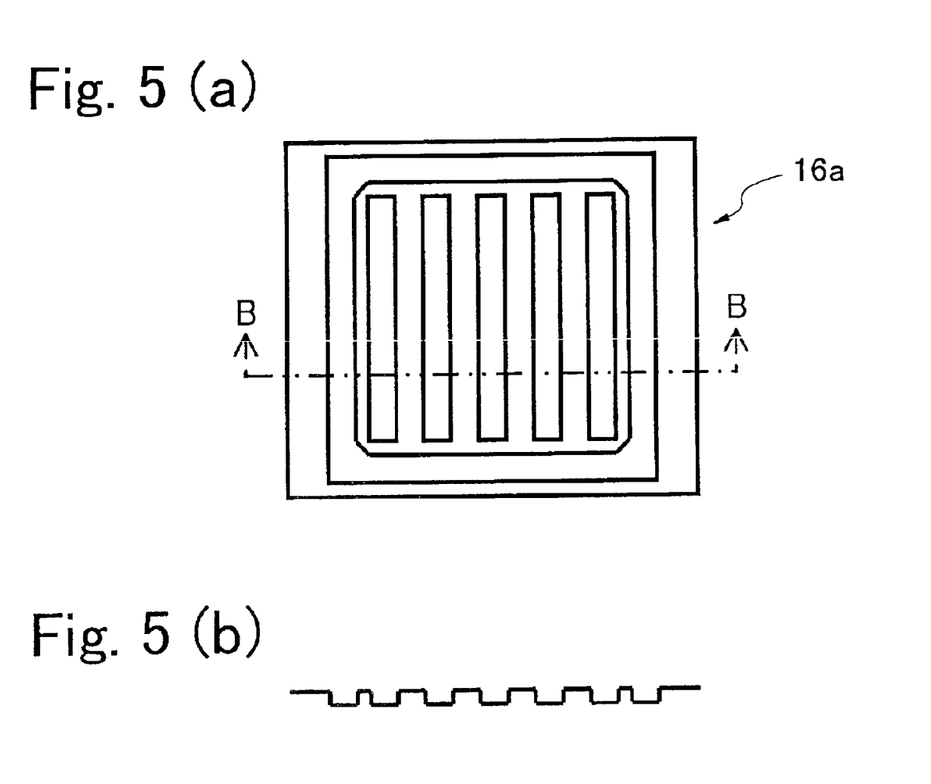
FIG. 5 shows an expanded groove pattern of the upper roller in FIG. 4.
Figure 6:
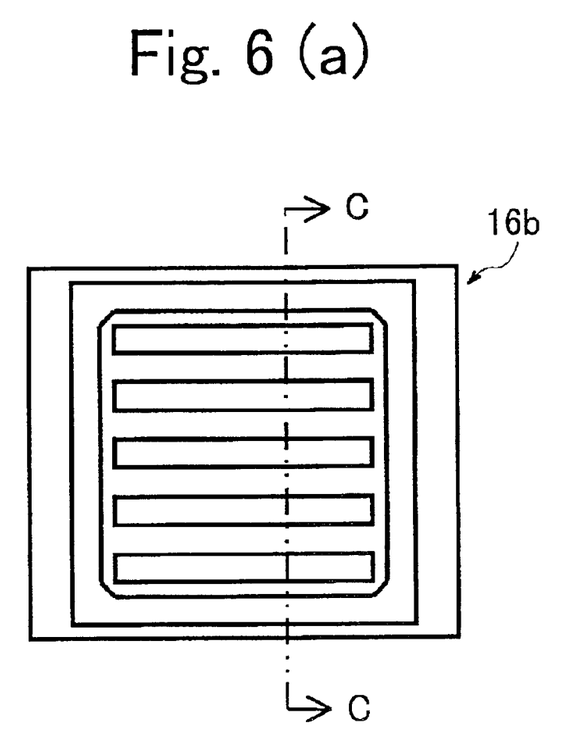
FIG. 6 shows an expanded groove pattern of the lower roller in FIG. 4.
Figure 7:
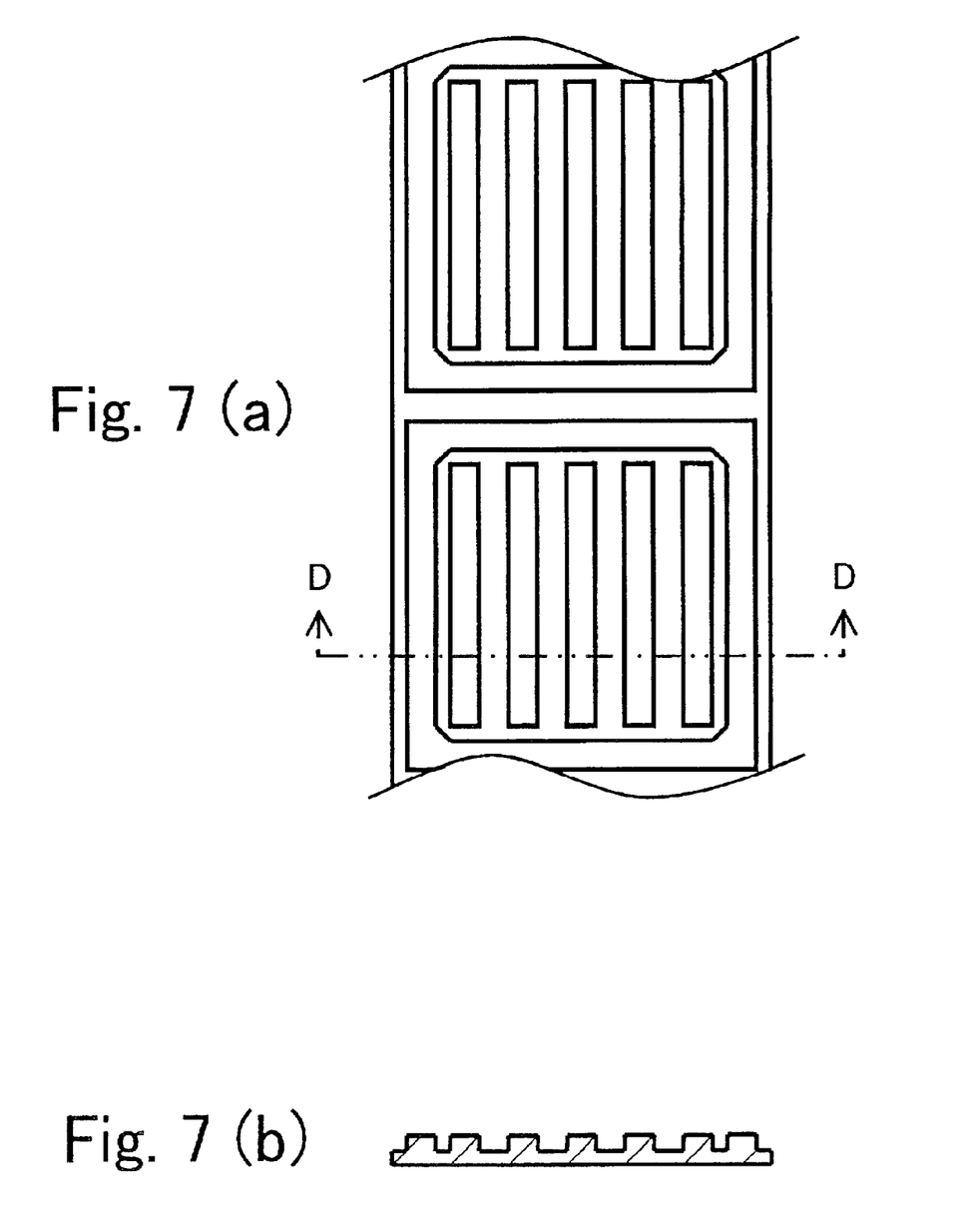
FIG. 7 shows a groove pattern of the separator formed by the upper roller in FIG. 4.

The base material manufactured by the same procedures as described at Steps 1 and 2 of Examples 1 was rolled by the first rollers 15 heated at 230° C. to be the sheet-form base material. The base material was further rolled and grooved by the upper roller 16a and the lower roller 16b heated at 180° C., which were provided in the rolling rollers 16 in FIG. 1. The upper roller 16a and the lower roller 16b had the grooving patterns shown in FIG. 4 on each peripheral surfaces. The sheet-form base material was formed to be the separator which was preferable in appearance and has the width of 100 mm and the thickness of 1.5 mm, and wherein the groove patterns were transferred form the grooving patterns of the rolling rollers 16 as shown in FIGS. 7(*a*) and 8(*a*). In addition, FIG. 5(*a*) shows an expanded view of the peripheral surface of the upper roll 16a. FIG. 5(*b*) shows a cross sectional view taken along the line B—B of FIG. 5(*a*). In the same way, FIG. 6(*a*) shows an expanded view of the peripheral surface of the lower roll 16b. FIG. 6(*b*) shows a cross sectional view taken along the line C—C of FIG. 6(*a*).

FIG. 7(*a*) shows one groove pattern of the resulting separator, which was transferred by the upper roller 16a. The one groove pattern was formed for supplying the fuel gas or the oxidizer gas to the electrodes (not shown). FIG. 7(*b*) shows a cross sectional view taken along the line D—D of FIG. 7(*a*).

Figure 8:
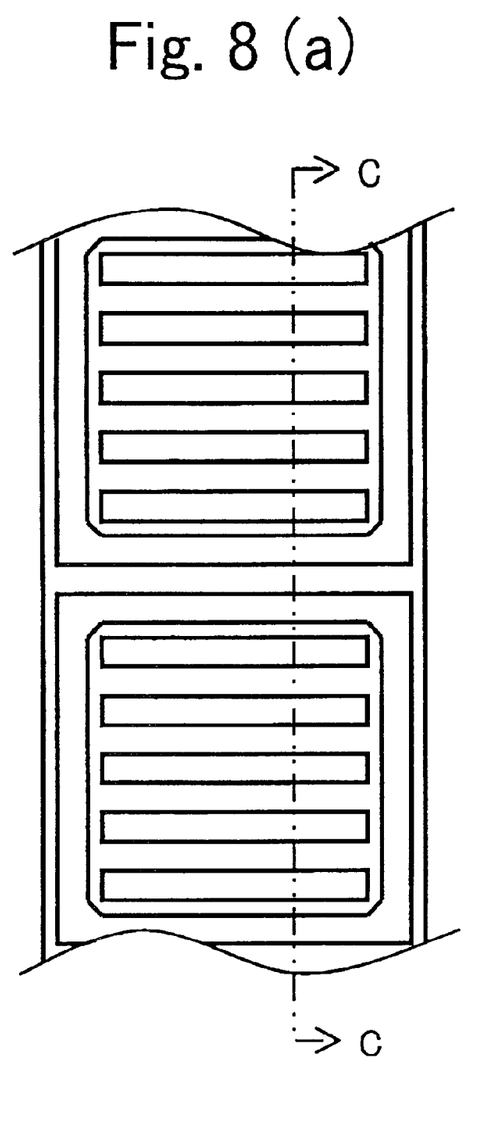
FIG. 8 shows a groove pattern of the separator formed continuously by the lower roller in FIG. 4.

FIG. 8(*a*) shows another groove pattern transferred from the grooving pattern of the lower roller 16b. The other groove pattern was formed on the backside of the resulting separator shown in FIG. 7(*a*). FIG. 8(*b*) shows a cross sectional view taken along the line E—E of FIG. 8(*a*).

What is claimed is:

1. A method for producing a separator for a fuel cell comprising the steps of:

mixing carbon particles with thermoplastic resin particles to produce mixed particles;

kneading the mixed particles to form pellets;

extruding the mixed and kneaded pellets;

forming the mixed and extruded pellets into a sheet-form base material;

forming grooves on the sheet form base material by rolling with a roller having a pattern on a peripheral surface thereof, wherein the pattern on the roller is transferred on the separator to have a predetermined groove pattern; and cutting or forming the sheet form base material into a separator having a desired profile.

2. The method for producing the separator for the fuel cell according to claim 1, wherein:

the mixed particles include the thermoplastic resin between 20 and 40 weight percent.

3. The method for producing the separator for the fuel cell according to claim 1, wherein:

the mixed particles include carbon between 60 and 80 weight percent and thermoplastic resin between 40 d 20 weight percent.

4. The method for producing the separator for the fuel cell according to claim 1, wherein:

the thermoplastic resin comprises at least one of polyphenyl sulfide, polyvinylidene fluoride and liquid crystal polyester.

5. The method for producing the separator for the fuel cell according to claim 1, wherein:

the step of extruding is carried out by an extruding machine or an injection machine.

6. The method for producing the separator for the fuel cell according to claim 1, wherein:

the step of extruding is carried out by an injecting molding or a rolling molding.

7. The method for producing the separator for the fuel cell according to claim 1, wherein:

the formed grooves are designed for supplying the fuel gas, the oxidizer gas, and cooling water to the electrodes of the fuel cell.

* * * * *